United States Patent [19]

Burkart et al.

[11] 4,196,837

[45] Apr. 8, 1980

[54] METHOD OF INDIRECTLY CONNECTING TWO PARTS

[75] Inventors: Klaus Burkart, Immenstadt; Manfred Wintzer, Unterpfaffenhofen, both of Fed. Rep. of Germany

[73] Assignee: Siemens Aktiengesellschaft, Berlin & Munich, Fed. Rep. of Germany

[21] Appl. No.: 928,684

[22] Filed: Jul. 27, 1978

[30] Foreign Application Priority Data

Sep. 23, 1977 [DE] Fed. Rep. of Germany ....... 2742921

[51] Int. Cl.² ..................... B23K 1/20; B23K 21/00
[52] U.S. Cl. ................................. 228/116; 228/3.1; 228/4.1; 228/121; 228/122; 427/100; 427/124; 427/404; 427/405; 427/409; 427/419.6
[58] Field of Search ............... 228/121, 122, 3.1, 4.1, 228/116; 427/100, 419 E, 124, 404, 405, 409

[56] References Cited

U.S. PATENT DOCUMENTS

| 4,037,176 | 7/1977 | Ono | 427/100 |
| 4,077,558 | 3/1978 | Allen | 228/121 |
| 4,129,242 | 12/1978 | Dias | 228/121 |

FOREIGN PATENT DOCUMENTS 2253913  5/1973  Fed. Rep. of Germany.

Primary Examiner—Michael F. Esposito
Attorney, Agent, or Firm—Hill, Van Santen, Steadman, Chiara & Simpson

[57] ABSTRACT

A method of indirectly connecting two parts, such as an acousto-optical building component composed of lead glass and a piezo electric transducer composed of lead-zirconium titanate, whereby at least one mono-molecular layer (having a maximum thickness of 100 nm) composed of a lead-free glass is directly applied under vacuum onto the surfaces of the parts to be joined and metal layers are then applied under vacuuum onto such glass layer and/or the surfaces to be joined so that when the free surfaces of such free metal layers are brought into contact with one another under vacuum, a bond forms therebetween and such bonds indirectly connect the parts with one another. The glass layer prevents diffusion of atoms or ions from the materials (such as lead) on either side of such layer so that the parts so-joined and/or the bonds so-formed are not impaired in any way.

5 Claims, 4 Drawing Figures

METHOD OF INDIRECTLY CONNECTING TWO PARTS

BACKGROUND OF THE INVENTION

1. Field of the Invention

The invention relates to a method of indirectly connecting two parts and somewhat more particularly to such a method whereby metallic layers are applied under vacuum to the surfaces to be connected and are then brought into contact with one another without ventilation under the maintained vacuum to form the desired bond.

2. Prior Art

German Publication Application DT-OS 2,253,913 discloses a method of indirectly connecting two parts by applying, under vacuum, metallic layers on the surfaces to be connecting and forcing such layers against one another to form a bond. In this method, an acousto-optical building component comprised of, for example, quartz is joined with an electro-mechanical converter, such as a piezo-electric crystal so that the resultant structure comprises an acoustical light deflection system. In order to achieve the desired bond between such parts, two consecutive metallic layers are provided on appropriate surfaces of such parts. A first layer is composed of gold and chromium and the other layer is composed of indium. The metals forming such layers are vaporized from suitable sources within a vacuum chamber and are deposited on the surfaces of the respective parts to be connected, which are then bonded to one another via such layers. In this system, the layer composed of gold and chromium has a thickness of a few thousand Angstrom units and the indium layer is of approximately the same thickness. After such metallic layers have been applied onto the respective surfaces to be joined, the free surfaces of the respective indium layers are brought into contact against one another and compressed under vacuum for a few minutes at a pressure of about 2,800 to 3,500 N/cm$^2$ (Newtons per square centimeter) so that such indium layers and the parts supporting such layers become interconnected by cold welding. The indirect connection or bond established in this manner is essentially a non-detachable connection, that is, it can only be severed by a break or by a mechanical superstress.

However, the above described prior art method cannot be utilized with all types of materials, particularly when the thickness of the metal layers used to form the indirect bond is relatively small. Nevertheless, it was discovered that as the layer thickness of the metal layers is decreased, the pressure required for cold welding can be reduced (further details regarding the use of relatively thin metal coatings for pressure-free cold welding are disclosed in our companion co-pending application Ser. No. 928,683 filed July 27, 1978 which is incorporated herein by reference). Thus, when metal coatings having a thickness ranging between 0.5 and 55 nm (nanometers) are utilized, practically no pressure is required for forming a cold welded bond. This is of material advantage, particularly with pressure-sensitive materials. However, with metal layer thicknesses below 0.5 nm, it is no longer possible to achieve a firm and durable indirect connection with acousto-optical building components composed of, for example, lead glass or with piezo-ceramic transducers composed of, for example, zirconium titanates. Depending on the thickness of the metal coatings utilized with such materials, either no welded connection at all is obtained or no durable welded connection is obtained. Further, if one of the parts to be joined is made of a metal, in most cases, indirect permanent connections also cannot be produced in this manner.

SUMMARY OF THE INVENTION

The invention provides an improved method of indirectly joining two parts which may be composed of any material, such as glass, metal, ceramic or crystal so that such parts may be indirectly bonded to one another in a firm and durable manner.

In accordance with the principles of the invention, a method of the initially described type (DT-OS '913) is improved by applying at least one mono-molecular up to a thickness of max 100 nm intermediate layer of a lead-free glass onto at least one of the connecting surfaces prior to the application of the metal coatings thereon. Such intermediate glass layer acts as a diffusion blocking layer and is applied to those parts which, based on their material properties, adversely affect a welded connection between the metal layers. Such an intermediate layer prevents, for example, lead from diffusing from parts containing lead into the metal coatings. Similarly, the intermediate layer also prevents the metal within the metal coatings from diffusing into one or both parts being connected with each other via such metal coatings since such diffusion might weaken or sever the formed bond. The intermediate glass layer applied to one or both of the surfaces to be connected, as the case may be, consists of a lead-free glass and provides a safe and durable indirect bonding. The bonding of the intermediate layer to the connecting surfaces of the parts, on the one hand, and to the metal coatings on the other hand, is excellent, so that indirect connections with high mechanical strength are readily produced via the principles of the invention.

The intermediate layer of lead-free glass may be applied in any desired manner, for example by oxidation of a silicon layer onto the surfaces to be connected or by coating such surfaces with glass-forming substances. However, it is preferable to vapor-deposit such an intermediate glass layer in vacuum or to sputter it on the desired surfaces. Such techniques produce particularly good adhesion on the surfaces to be connected. Further, intermediate layers vapor-deposited or sputtered on under vacuum onto the connective surfaces provide an extremely uniform layer thickness and planar surfaces which exhibit only minor roughness characteristics.

Preferably, an intermediate layer with a maximum thickness of 100 nm is applied onto one or both of the surfaces to be joined. This provides an additional improvement in the surface condition of the intermediate layer because, as has been noted from experience in applying layers having a thickness exceeding 100 nm, undesired differences in layer thicknesses can hardly be avoided with thicker layers. In a preferred embodiment of the invention, an intermediate layer having a thickness of about 50 nm to 80 nm is applied onto at least one of the surfaces to be joined. In this thickness range, a substantially fail-safe diffusion blocking layer is attained, that is, one that is not dispersed by micropores, and a high surface quality is readily achieved.

In another preferred embodiment of the invention, the surfaces to be connected are machined, prior to the application of the intermediate glass layer, to a smoothness of less than 1 micron and a roughness depth of less than 0.1 micron (i.e. an average valley-to-peak dimension). Such surface qualities of the connecting surfaces provide an extremely planar and smooth surfaced metal coating. By bringing such smooth metal coatings into surface contact with each other during the welding step, the security and mechanical strength of the welded connection is further improved.

DESCRIPTION OF THE PREFERRED EMBODIMENTS

Figure 1:
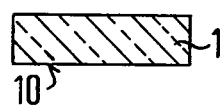
FIGS. 1 and 2 are elevated cross-sectional views of two parts to be indirectly joined with one another via the principles of the invention.
Figure 2:
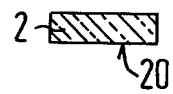
Figure 3:
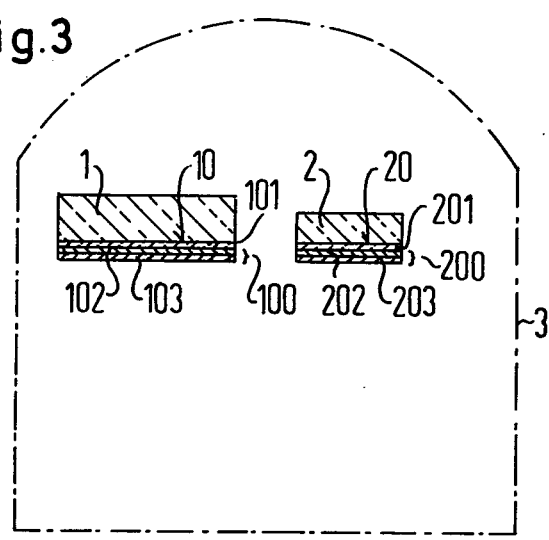
FIG. 3 is an elevated somewhat schematic simplified view, partially in phantom, of an arrangement utilized during the practice of an embodiment of the invention.

FIG. 1 illustrates an acoustical-optical building component 1, for example composed of lead glass, which, in order to form an acoustical light deflection system, must be connected with a piezo-electrical transducer 2, such as shown in FIG. 2, and which may be composed of lead-zirconium titanate.

In order to establish a desired indirect bond between such parts or components, select connecting surfaces, such as surface 10 of component 1 and surface 20 of component 2 are first machined plane and smooth by known grinding and/or lapping techniques. Preferably, such connecting surfaces are machined until a planeness of less than about 1 micron, and more preferably until a planeness of 2 to 3 Newton rings is achieved.

After careful preparation of the connecting surfaces 10 and 20 of the components 1 and 2, such components are positioned within an operational vacuum housing (such as indicated in phantom dash-dot lines 3). Such housing provides a controlled vacuum condition about the part to be joined and provides a working environment for applying the desired coatings on the parts to be joined. A suitable source (not shown) of a lead-free glass is operationally positioned within the vacuum housing 3 and activated, as by heating, so that, for example, vapor deposition of the lead-free glass occurs onto the connecting surfaces 10 and 20. In this manner, intermediate layers 101 and 201 of a lead-free glass having a thickness of about 80 nm are substantially simultaneously applied onto the surfaces 10 and 20 of components 1 and 2. The application of the intermediate layers 101 and 201 may be accomplished, for example, by cahtode sputtering of pure $SiO_2$ or by vapor deposition of silicon monoxide in an oxygen-containing residual gas atmosphere. However, a so-called evaporation glass may also be utilized, which likewise must be lead-free and may best be vaporized via an electron beam mass. Further, it will be appreciated that if one of the components, 1 or 2 is composed of a lead-free material such intermediate layer may be dispensed with.

After the application of the intermediate layers 101 and 201, a two-layer metal coating 100 and/or 200 is vapor-deposited or sputtered on such intermediate layers. In order to form the metal coating 100, a lower adhesive layer 102, composed of, for example, chromium or titanium, and having a thickness of about 2 nm is applied directly to the intermediate layer 101 and then a connecting layer 103, for example composed of gold, and having a thickness of about 10 nm is applied onto such adhesive layer. Substantially simultaneously, an adhesive layer 202 and a connecting layer 203 of the same materials and thicknesses are applied onto the intermediate layer 201, in instances where such is utilized.

Further, in place of the two-layer metal coatings 100 and 200, single layer metal coatings of substantially the same thickness may also be utilized. Such single metal coatings may be composed of, for example, titanium or chromium. Further details regarding the use of such metal coatings are disclosed in our companion co-pending application Ser. No. 928,683, which is incorporated herein by reference.

In order to finish the indirect bonding or connection between building component 1 and component or transducer 2, the free surfaces of connecting layers 103 and 203 are brought into contact with one another within the vacuum housing 3 without disrupting or otherwise altering the vacuum conditions within the housing. This process takes place at room temperature so that any tensions which may be caused by cooling are completely avoided. During the formation of this indirect connection or welding of the layers 103 and 203, components 1 and 2 may be compressed at a relatively low pressure, in the order of about 8 $N/cm^2$ (Newtons per square centimeter) so that an intimate contact of the surfaces being joined is insured.

Figure 4:
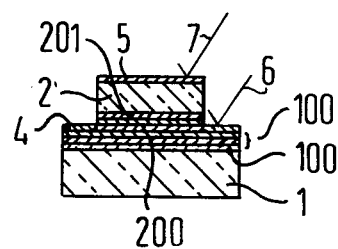
FIG. 4 is an elevated somewhat schematic view of an acoustic light deflection system produced in accordance with the principles of the invention.

FIG. 4 illustrates a finished acoustical light deflection system produced in accordance with the principles of the invention. The contacting of the piezo-electric transducer or component 2 is accomplished by providing electrodes 4 and 5, as by further vapor deposition or dusting-on and via contact springs 6 and 7.

The above described method of indirectly connecting an acousto-optical building component 1 with a piezoelectric converter or transducer 2 may be modified if the parts or components to be connected are composed of certain other materials. If, for example, in place of the piezo-electric transducer 2, a transducer composed of lithium niobate is utilized, the intermediate layer 201 may be dispensed with because lithium niobate contains no substances which could harm the indirect connection.

Thus, the principles of the invention are useful in a multiplicity of applications and provide vacuum and pressure-tight indirect connections or bonds where required. The advantageous effects of the intermediate layer comprised of a lead-free glass as a diffusion blocking means is particularly effective with extremely thin metal layers, having a thickness ranging between about 0.5 and 55 nm. These relatively thin metal layers can be very rapidly affected adversely by disturbing diffusion processes which interfere with their ability to form a durable bond. On the other hand, metal coatings of this thickness are desired, because in relation to thicker metal coatings, such thin coatings allow a substantially pressure-less bonding. With thicker metal coatings, for example, in the range of some thousand Angstrom units, the weldability is less rapidly adversely effected so that, as a rule, welding of such layers takes place with the application of substantial pressure. In the latter case, the disturbing diffusion processes lead toward a slow disintegration or dissolution of the bond, unless such is prevented by an intermediate layer. Thus, by practicing the principles of the invention, a solid and durable indirect connection may be produced between any part composed of glass, ceramic, metal or crystal which cannot be, practically, directly connected with each other. For example, windows made from quartz glass, filter glass or crystal may be indirectly fastened in a durable and strong manner to glass, ceramic or metal surfaces.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What we claim is:

1. In a method of indirectly connecting two parts whereby metal layers are applied under vacuum to surfaces of such parts to be connected and free surfaces of such metal layers are brought into contact with one another, the improvement comprising:
   applying at least one intermediate layer composed of a lead-free glass onto at least one of said surfaces prior to the application of said metal coatings, said intermediate layer being of a thickness not more than 100 nm.

2. In a method as defined in claim 1 wherein said intermediate layer is applied via vapor deposition under vacuum.

3. In a method as defined in claim 2 wherein said intermediate layer is applied with a maximum thickness of 100 nm.

4. In a method as defined in claim 3 wherein said intermediate layer is applied with a thickness of 50 nm to 80 nm.

5. In a method as defined in claim 1 wherein the surfaces of the parts to be joined are, prior to the application of said intermediate layer, machined to a planeness of less than about 1 micron and a roughness depth of less than about 0.1 micron.

* * * * *